(12) United States Patent
Norén et al.

(10) Patent No.: US 11,525,513 B2
(45) Date of Patent: Dec. 13, 2022

(54) SPIRAL CONVEYOR MEZZANINE SEAL

(71) Applicant: John Bean Technologies AB, Helsingborg (SE)

(72) Inventors: Kenny Tobias Norén, Råå (SE); Anders Rickard Schön, Staffanstorp (SE); Nils Anton Persson, Lund (SE)

(73) Assignee: John Bean Technologies AB, Helsingborg (SE)

( * ) Notice: Subject to any disclaimer, the term of this patent is extended or adjusted under 35 U.S.C. 154(b) by 426 days.

(21) Appl. No.: 16/663,247

(22) Filed: Oct. 24, 2019

(65) Prior Publication Data
US 2021/0123529 A1     Apr. 29, 2021

(51) Int. Cl.
*F16J 15/3268*      (2016.01)
*B65G 15/02*        (2006.01)

(52) U.S. Cl.
CPC .......... *F16J 15/3268* (2013.01); *B65G 15/02* (2013.01); *B65G 2207/24* (2013.01)

(58) Field of Classification Search
CPC .... F16J 15/00; F16J 15/16; F16J 15/50; F16J 15/52; F16J 15/3272; F16J 15/3276; B65G 15/00; B65G 15/02; B65G 15/12; B65G 15/18; B65G 2207/00; B65G 2207/24; B65G 39/09; B65G 69/00; B65G 69/008; B65G 69/18; B65G 69/181
USPC ........................................................ 277/500
See application file for complete search history.

(56) References Cited

U.S. PATENT DOCUMENTS

| | | | | |
|---|---|---|---|---|
| 5,515,775 A | * | 5/1996 | Crump, III ............. | B65G 21/18 99/479 |
| 2006/0054465 A1 | * | 3/2006 | Kraus .................... | B22D 30/00 198/756 |
| 2017/0318819 A1 | * | 11/2017 | van de Rijt ............ | A21B 1/245 |

FOREIGN PATENT DOCUMENTS

| | | |
|---|---|---|
| FR | 2 417 452 A1 | 9/1979 |
| GB | 2014530 B | 8/1979 |
| WO | 2017/192955 A1 | 11/2017 |

OTHER PUBLICATIONS

International Search Report and Written Opinion dated Feb. 5, 2021, in corresponding International Application No. PCT/EP2020/078584, filed Oct. 12, 2020, 14 pages.

\* cited by examiner

*Primary Examiner* — Nathan Cumar
(74) *Attorney, Agent, or Firm* — Christensen O'Connor Johnson Kindness PLLC (57) ABSTRACT

A thermal processing apparatus (20) includes a spiral conveyor system (22) configured into an ascending spiral stack (26). An inner mezzanine (40) is disposed within the circular interior of the stack (26) and an exterior mezzanine (42) encircles the spiral stack. The mezzanines divide the processing chamber (32) into a plurality of processing zones. A sealing system (90) seals the interior mezzanine (40) relative to the spiral stack (26). A sealing system (130) seals the outer mezzanine (42) relative to the exterior of the spiral stack, and a seal system (132) seals the outer mezzanine relative to the walls (56, 58) of the housing, thereby to limit the leakage of the processing fluid between the mezzanines and the spiral stack (26) and housing walls so that as much as the thermal processing medium is possible is forced through the spiral stack for processing work products carried on the conveyor system (22).

20 Claims, 10 Drawing Sheets

SPIRAL CONVEYOR MEZZANINE SEAL

BACKGROUND

Spiral conveyor based thermal processing systems include a cooking surface or a cooling/freezing surface in the form of a pervious self-stacking conveyor belt for conveying workpieces, including food, through a thermal processing chamber in a spiral or helical path. The self-stacking belt is arranged in and travels in circular tiers from the bottom of the spiral stack to the top and then perhaps in a second stack the belt travels from the top back down to the bottom of the stack. The bottom belt tier rests on and is driven by inner and outer drive chains, which in turn are supported on roller chains or ball chains that ride on support rails.

If the workpiece is being cooked or otherwise heated, a heat source, such as steam, air, or mixtures thereof, is provided within or adjacent the cooking chamber for cooking the workpieces. Correspondingly, if thermal processing is in the form of cooling or freezing, then a source of cooling medium is provided either within the cooling/freezing chamber or adjacent thereto.

An advantage of thermal processing systems utilizing spiral conveyor belts is that a relatively long processing path can be achieved with a small footprint. For example, a 600-foot long thermal processing conveyor belt in a spiral configuration can be contained within a 20 foot×20 foot×20 foot housing. However, spiral stack conveyor thermal processing systems do have drawbacks from a linear oven of a comparable length. In a linear oven, the upper and lower surfaces of the products are exposed to being efficiently impinged upon by the thermal processing medium. However, in a spiral oven, the workpiece is not as directly accessible to the thermal processing medium since the work products are arranged in stacked layers, thus requiring less direct thermal processing methods than direct impingement of the thermal processing medium onto the food product.

In one form of spiral stack conveyors, a fan system is used to direct the flow of the thermal processing medium vertically through the annulus of the spiral conveyor, either in the upward or downward direction, as well as to some extent horizontally across the layers of the spiral stack. One difficulty in this type of thermal processing medium flow arrangement is to achieve uniform thermal processing across the conveyor since typically the food product is arranged in multiple lanes with variable spacing along the conveyor. When the conveyor belt is in straight configuration, the food products can be fairly uniformly spaced across and along the conveyor. However, when the conveyor curves into a spiral, the food products on the inside of the conveyor become relatively closer together, whereas the food products on the outside of the conveyor become relatively further apart. As such, the food products on the inside of the conveyor tend to receive less thermal processing medium per food product relative to the food products located on the outside of the conveyor. As such, attempts have been made to direct at least some of the thermal processing medium across the levels or flights or tiers of the conveyor, typically from the outside toward the center of the spiral.

Other techniques that have been employed in an effort to more uniformly thermally treat food products in a spiral stack conveyor include reversing the direction of flow of the thermal treatment medium while the food product is moving along the spiral conveyor. For example, during part of the processing cycle, the thermal processing medium may be directed upwardly through the annulus of the spiral, and then later in the thermal process, the direction of flow of the processing medium may be reversed to flow from the top of the conveyor stack down.

Another effort in achieving more uniform thermal processing is to employ baffles or mezzanines around and/or within the center of the spiral conveyor to control the direction of the thermal processing medium flow through the spiral stack. In this regard, one or more inner mezzanines have been positioned with the center of the spiral stack to essentially divide the spiral stack into different thermal processing zones. For example, a first thermal processing zone may be at a higher pressure, and a second thermal processing zone may be at a lower pressure. The heat transfer between the thermal processing medium and the workpiece primarily occurs either by condensation heat transfer or convection heat transfer. An outer mezzanine may also be positioned around the spiral stack and extending to the inner walls of the thermal processing chamber.

For optimum performance of the thermal processing system, it is important that as much of the thermal processing medium is forced through the spiral stack where the food products are located, and as little processing medium as possible bypasses the spiral stack. To this end, various types of seals have been employed between the inner mezzanine and the inside of the spiral stack as well as between the outer mezzanine and the exterior of the spiral and between the outer mezzanine and the inner walls of the thermal processing chamber.

However, it is not possible for the mezzanine floors to fit tightly against the spiral stack or the enclosure wall for several reasons, including that the spiral stack(s), as well as the thermal processing chamber structure, thermally expand and contract differently from each other. Also, the chamber may bulge depending on air pressure difference between the interior of the chamber and the ambient. In addition, the spiral stack may vary in diameter depending on the operating conditions, for example, the temperature and pressure within the thermal processing chamber, the level of load being carried by the conveyor, and the level of wear of the conveyor belt. Further, the spiral stack rotates and may not be perfectly round, thus the exterior and/or interior perimeter of the spiral stack do not travel in a perfect circle. In addition, the fans used to circulate the thermal medium within the thermal processing chamber may cause vibrations that are transferred to the mezzanine floor structures.

Heretofore strips of flexible material have been used in an effort to seal the gap between the mezzanine floor and the interior and exterior of the spiral stack, as well as the sealed gap between the mezzanine floor and the inner wall of the thermal processing chamber. In one effort in this regard, flexible strips have been fastened to the mezzanine floor by popper rivets so that the strips project laterally from the mezzanine floor to bear against or closely adjacent the spiral stack or the processing chamber interior walls. This solution has not been optimal from a hygiene perspective due to, for example, the popper rivets and the overlapping surfaces of the flexible seal strips forming pockets which accumulate dirt and debris, and which are hard to clean.

The present disclosure seeks to address the shortcomings of existing mezzanine floor seals to provide effective and more hygienic seals between the mezzanine floors and the spiral conveyor and between the mezzanine floors the thermal processing chamber structure.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a seal system for sealing between a moving conveyor and a structure stationary relative to the conveyor, the structure having a margin adjacent the conveyor, the seal system comprising:

a series of hooks extending along the margin of the structure, the hooks having a shank projecting from the structure margin and a flange extending from the shank and spaced from the structure margin; and at least one seal strip engageable with and disengageable from the hooks positioned along the structure margin, the seal strip comprising a plurality of slots extending through the seal strip and spaced apart to coincide with the spacing of the hooks, the slots having a length and a width to engage over the hook flanges and then slide relative to the hook shanks along the length of the structure margin to lock an end of the slots against the hook shanks.

In accordance with another embodiment of the present disclosure, a seal system for forming a seal between first and second relatively movable structures, the seal system comprising:

wherein one of the first and second structures having a margin adjacent the other of the first and second structures;

a series of hooks extending along the margin of the first or second structure, the hooks having a shank portion projecting from the margin and a flange extending from the shank, the flange spaced from and extending along the margin of the structure; and at least one seal strip engageable and disengageable from the hooks, the seal strip comprising a plurality of slots extending through the seal strips and spaced apart to coincide with the spacing of the hooks, the slots having a length and a width to enable the slots to engage over the hooks and then slide relative to the hooks along the lengths of the slots to lock against the hook shanks; and the seal strip of a width to closely abut or contact against the other of the first and second structures when engaged with the hooks.

In any of the embodiments described herein, the hook flange extending in opposite directions from the shank along the structure margin.

In any of the embodiments described herein, the hook flange(s) are elongated in the direction along the structure margin.

In any of the embodiments described herein, further comprising an upright rim extending along the structure margin to define an upper edge, the hooks extending upwardly from the rim upper edge.

In any of the embodiments described herein, the hooks are integrally formed with the rim.

In any of the embodiments described herein, the hooks extend lengthwise of the rim with the hook flanges spaced from the rim.

In any of the embodiments described herein, the lengths of the slots are slightly shorter than the lengths of the hook flanges.

In any of the embodiments described herein, the widths of the slots are slightly wider than the thickness of the hooks.

In any of the embodiments described herein, the widths of the slots are slightly wider than the thicknesses of the hook flange and shank.

In any of the embodiments described herein, a notch is formed along the length of the slot to widen the slot relative to the width of the hook flange.

In any of the embodiments described herein, the seal strip is flexible and of a width to closely abut or contact against the conveyor.

In any of the embodiments described herein, the seal strips have an attachment margin along which the slots are located and an opposed flexible seal margin for closely abutting or contacting the conveyor.

In any of the embodiments described herein, the structure margin is formed in a series of straight segments with adjacent segments disposed at an angle to each other to define an overall curved shape.

In any of the embodiments described herein, the margin of the structure forms an overall curved shape.

In any of the embodiments described herein, the conveyor is a spiral conveyor and the structure comprises a platform either surrounding or disposed within the interior of the spiral conveyor.

In any of the embodiments described herein, the first structure is a spiral conveyor and the second structure comprises a platform either surrounding or disposed within the interior of the spiral conveyor.

In any of the embodiments described herein, the first structure is a wall and the second structure comprise a platform located adjacent the wall structure.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "forward," "rearward," "front," "back," "upward," "downward," "right-hand," left-hand," "in," "out," "extended," "advanced," "retracted," "proximal," "distal," "central," etc. These references and other similar references in the present application are only to assist in helping describe and understand the present invention and are not intended to limit the present invention to these directions or locations.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The term "about," "approximately," etc. means plus or minus 5% of the stated value.

In the present application and claims, references to food products are meant to include all manner of food products that are commonly thermally processed. Such food products may include meat, fish, poultry, fruits, vegetables, nuts, herbs, spices, grains, pasta, bread dough, pizza dough, or other types of dough as well as other types of foods.

The present application and claims in part relate to systems and methods for the thermal processing of work products, including food products. In the illustrated embodiment of FIGS. 1 and 2, the thermal processing of the food product may be directed at a freezer for freezing food products or to an oven for cooking food products. In this regard, the thermal processing apparatus 20 includes a spiral conveyor system 22 wherein the conveyor belt 24 is configured into an ascending spiral stack 26. A circulation system 30 delivers a gaseous thermal processing medium to the food products or to other workpieces disposed on the spiral stack 26. The spiral stack 26 is contained within a processing chamber 32, and the circulation system 30 circulates the thermal processing within the chamber. The conveyor belt 24 supports and transports workpieces/food products through the spiral stack 26. A mezzanine assembly (including inner and outer mezzanines 40 and 42), as described in greater detail below, divide the spiral stack 26 and the chamber 32 into a plurality of processing zones or segments.

Thermal Processing Chamber

Figure 1:
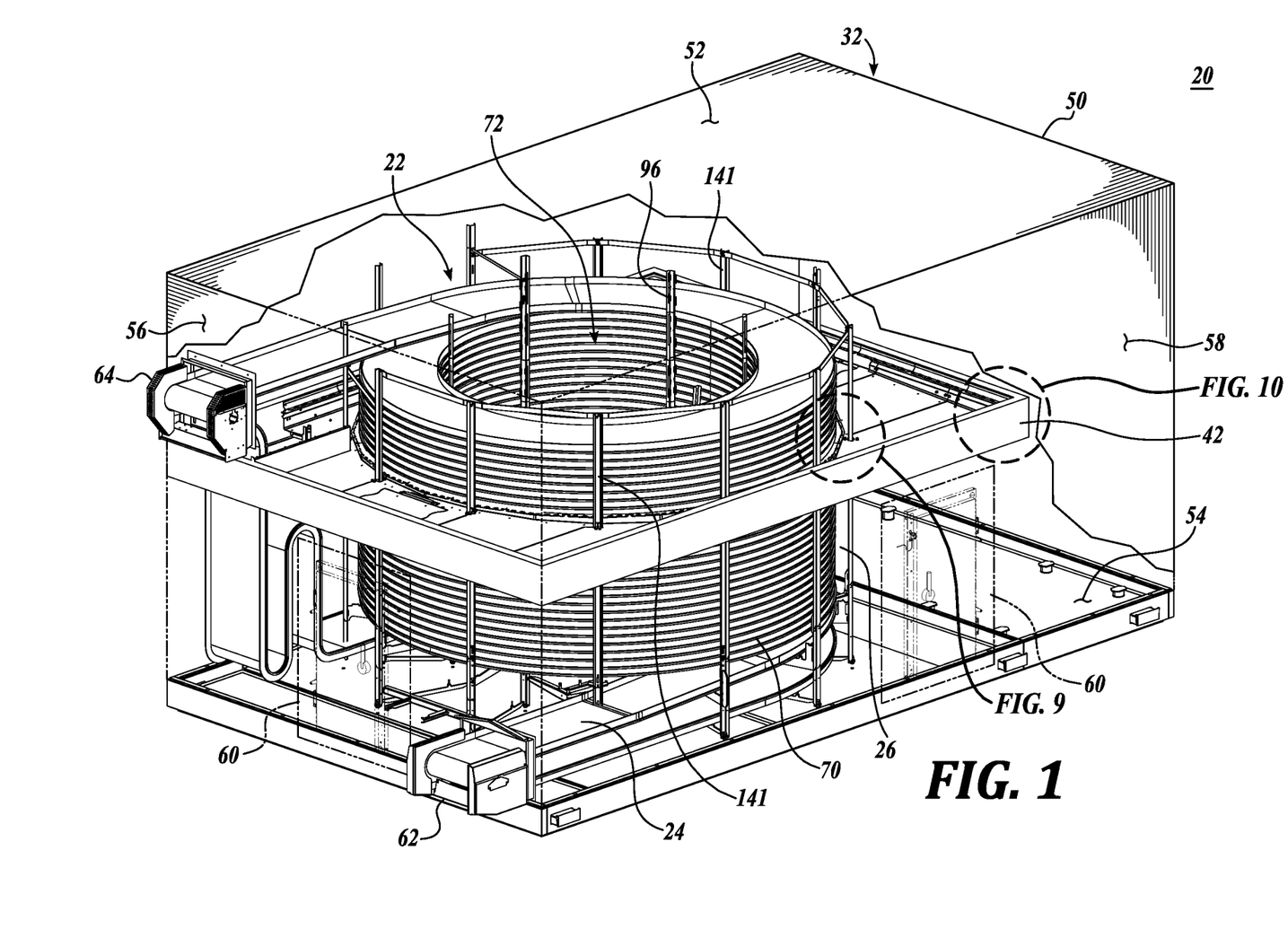
FIG. 1 is a pictorial view of a thermal processing system including a spiral conveyor disposed within a thermal processing chamber.
Figure 2:
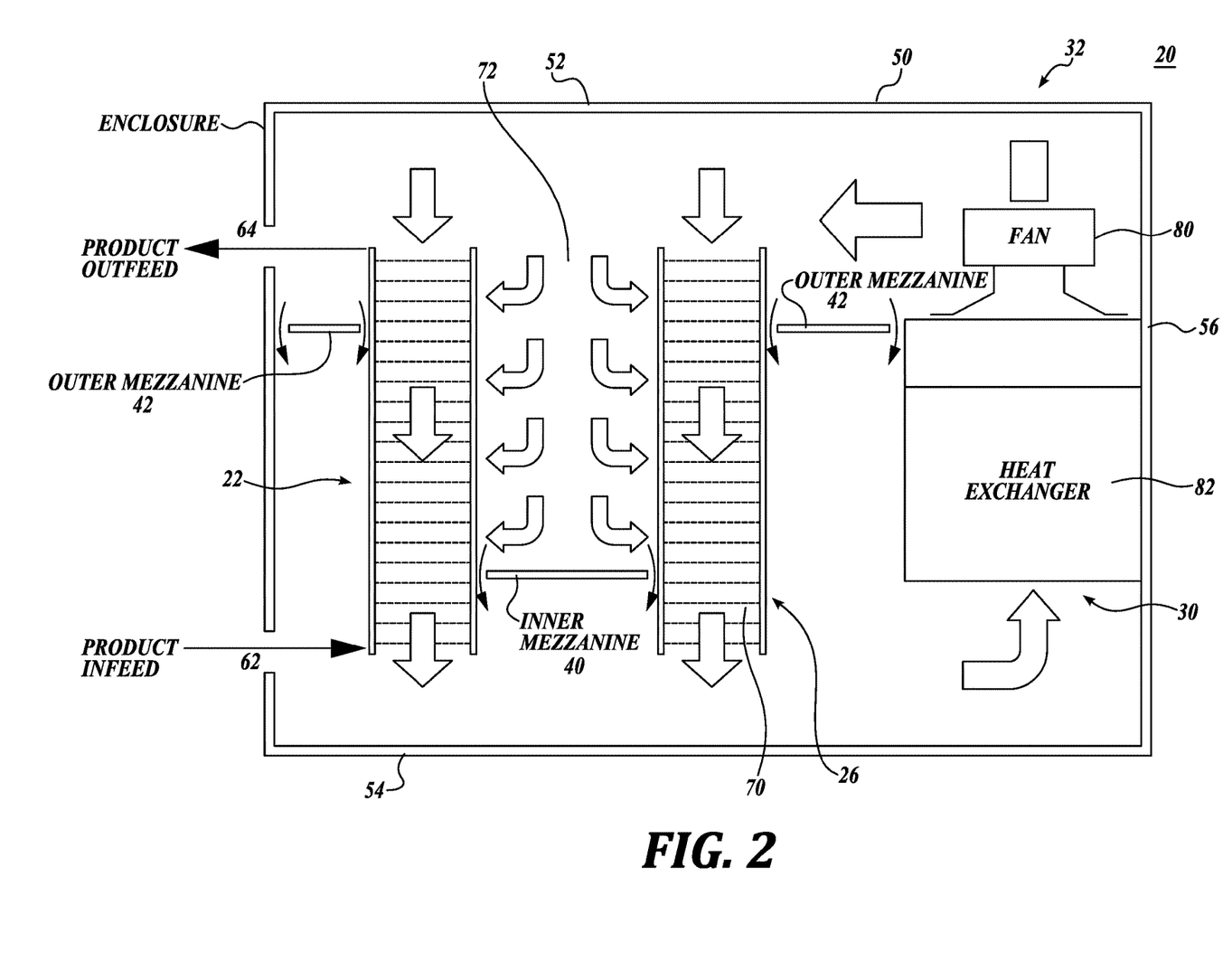
FIG. 2 is a schematic cross-sectional view of FIG. 1.

Next describing the thermal processing system 20 in greater detail, as shown in FIGS. 1 and 2, the thermal processing chamber 32 includes an insulated housing 50 that can be of various constructions and shapes. For example, the housing 50 can be generally rectilinear or generally cylindrical in shape or in other shapes to accommodate the belt stack 26, as well as the other components of system 20 located within the housing, including circulation system 30. The housing 50 includes a ceiling 52, a floor 54, end walls 56, and side wall 58. Access doors 60 are located in an end wall and the side wall. The housing also includes an inlet 62 located at a lower portion thereof through which work products enter the housing, and an outlet 64 in an upper portion of the housing through which the work product exits the housing.

An appropriate sealing mechanism can be utilized to retain the housing 50 substantially sealed from the exterior. Such sealing mechanisms may include, for example, an air knife or similar device adjacent housing inlet 62, as well as a second air knife adjacent housing outlet 64. Of course, other types of sealing mechanisms may be utilized, for example, a curtain of flexible strips, constructed of a sheet material such as Teflon® plastic or fabric coated with Teflon®, that substantially blocks the openings at conveyor openings at inlet 62 and outlet 64, significantly reducing thermal processing medium leakages, and that are sufficiently flexible to conform to the shapes of the moving conveyor belt and food products FP being carried by the conveyor 22. Of course, the plastic curtain construction may require periodic cleaning to help ensure that undesirable microorganisms do not lodge on the curtain.

As noted above, belt stack 26 is located within the interior of housing 50, with the conveyor traveling in an ascending helical path entering the bottom of housing 50 through entrance 62 and then exiting the housing 50 through outlet 64 at an upper location in the housing. Although a single belt stack 26 is shown as positioned within the housing 50, the housing can be adapted to contain other numbers of belt stacks. For example, a second belt stack may be located adjacent belt stack 26 wherein the conveyor travels in a descending helical path before exiting the hosing at a lower portion of the housing.

Conveyor Belt

Suitable embodiments of spiral stacking belts are shown and described in U.S. Pat. No. 3,938,651, issued to Alfred et al., and U.S. Pat. No. 5,803,232, issued to Frodeberg, the disclosures of which are hereby expressly incorporated by reference. However, it should be appreciated that other suitable spiral belt assemblies are also within the scope of the present disclosure.

Referring to FIGS. 1 and 2, when arranged as a spiral stack 26, the pervious conveyor belt 24 is configured into a plurality of superimposed flights or tiers 70 that are stacked on top of each other (i.e., known in the art as "self-stacking" conveyor belts). In that regard, each tier 70 of the stack 26 forms a pervious annulus, through which gaseous thermal processing medium may travel. When formed in spiral stack 26, the plurality of tiers 70 creates an inner cylindrical channel 72, through which the thermal processing medium may also travel. The work products travel on the conveyor belt 24 and are treated by thermal processing medium in the chamber 32. An exemplary spiral stack 26 may have any number of tiers 70, typically in the range of about 8 to about 45 tiers.

Thermal Processing Medium Circulation System

As noted above, numerous systems and methods have been employed to route the thermal processing medium through the chamber in a desired direction(s) and velocities. In the present disclosure, the air circulation system 30 employs a circulation fan 80 disposed within the chamber 32 alongside the spiral stack 26. The circulation fan 80 draws processing medium downwardly through the annular interior of the spiral stack 26 so as to thermally treat the work products being carried on the conveyor belt 24 and then directing the spent processing medium upwardly alongside wall 56 of the housing 50 to the top of the housing. During the upward travel of the processing medium, the fan 80 directs the processing medium through a heat exchanger 82 to either heat the processing medium or cool the processing medium depending on the function of the thermal processing system 20. The fan 80 directs the heated/cooled thermal processing medium downwardly through the top of the spiral stack 26 as well as into the center of the spiral stack from which location the thermal processing medium flows laterally into the annulus of the spiral stack to provide thermal processing of the work product carried by the conveyor.

As noted above, the present disclosure pertains to a sealing system for helping prevent the processing fluid from bypassing the spiral stack by flowing between the inner mezzanine and the spiral stack as well as flowing between the outer mezzanine and the spiral and between the outer mezzanine and the inner walls of the thermal processing chamber.

Inner Mezzanine Sealing System

Figure 3:
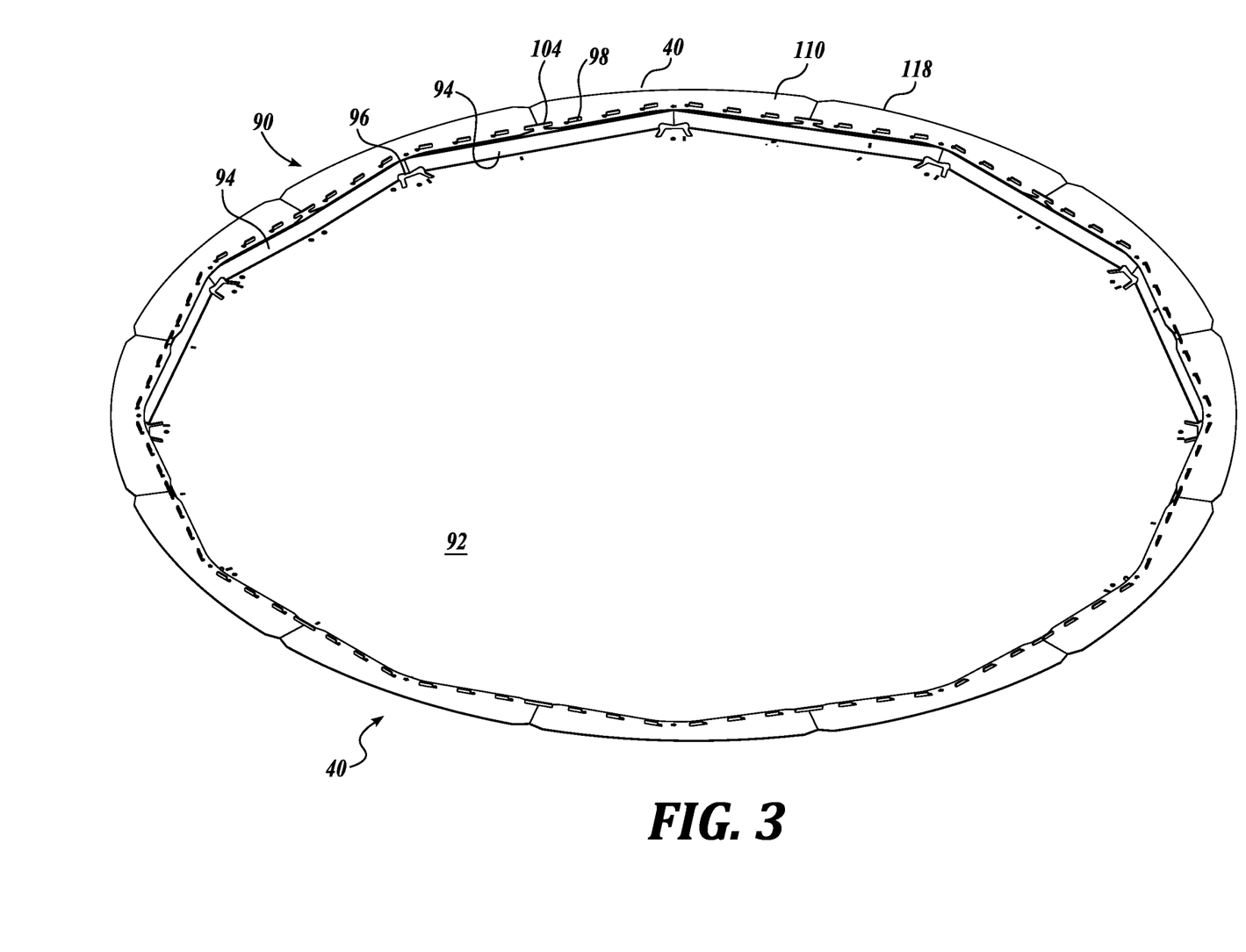
FIG. 3 is a pictorial view of the inner mezzanine with a seal of one embodiment of the present disclosure mounted thereon.

Referring initially to FIG. 3, the present disclosure provides a sealing system 90 to seal the inner mezzanine 40 relative to the spiral conveyor stack 26. As shown in FIG. 3, the inner mezzanine 40 includes a generally circular floor structure 92 with the perimeter thereof defined by formed rim sections 94 that extend upwardly from the outer edge of the floor structure 92 to an elevation rising above the top surface of the floor structure thereby to form a continuous ring around the perimeter of the floor structure 92. See also FIGS. 4 and 5.

Figure 5:
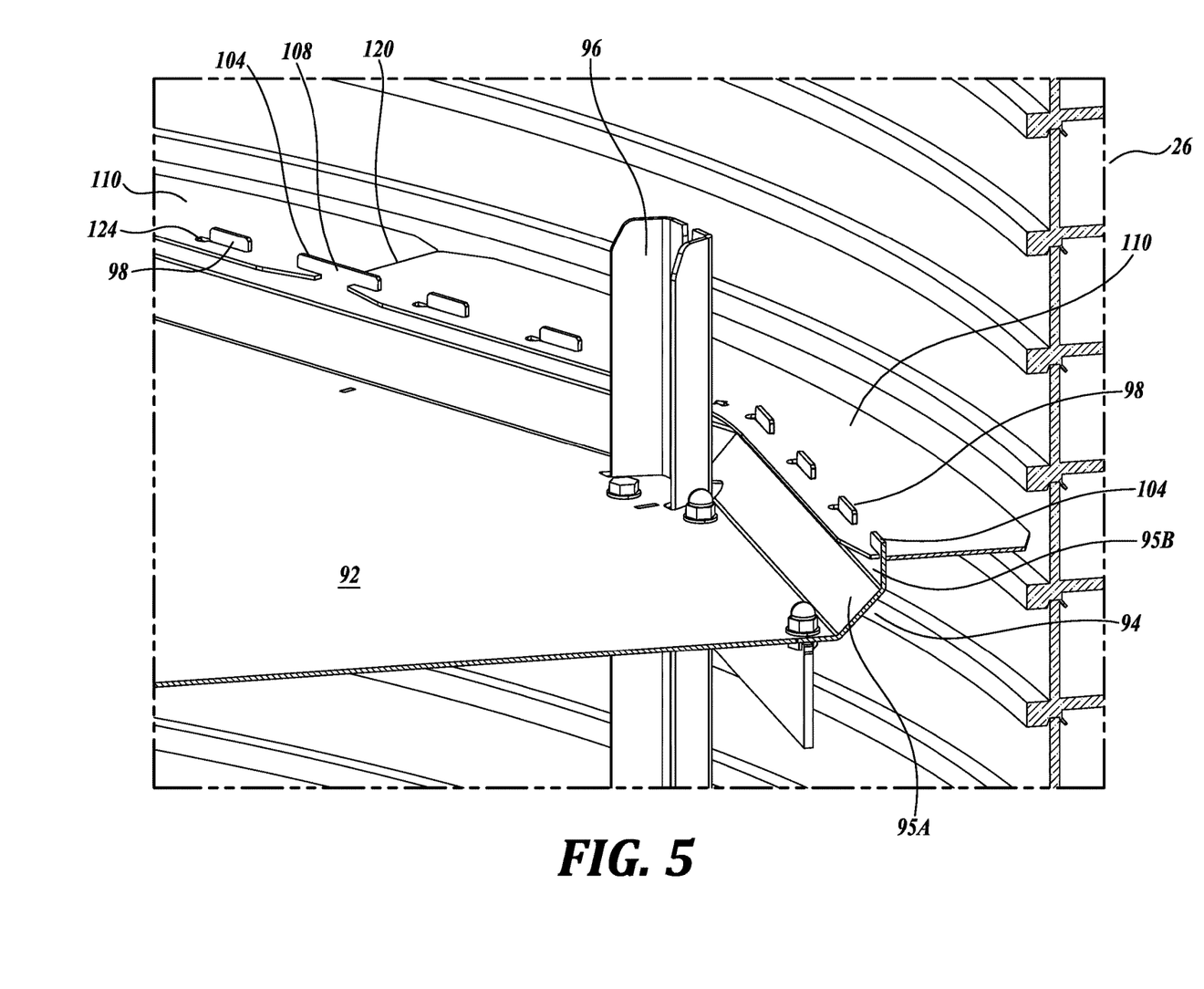
FIG. 5 is a fragmentary isometric view showing a portion of the mezzanine structure of FIG. 3 installed within the center of a spiral conveyor.

The rim sections 94 extend between support posts 96 extending upwardly along the interior of the spiral stack 26, see FIG. 1. As shown in FIG. 5, the rim sections 94 include a lower portion 95A that extends upwardly and outwardly from the floor 92 and an upper portion 95B that extends upwardly from the lower portion 95A. Although not illustrated, in a standard manner the floor structure 92 may be reinforced so as to support the weight of personnel that operate, repair, clean, etc., the thermal processing apparatus 20.

Referring specifically to FIGS. 3-6, a series of hooks 98 are spaced along the upper edge of the rim upper portion 95B to extend upwardly therefrom. Each of the hooks 98 is in the form of a shank section 100, which extends upwardly from the upper edge of the rim upper portion 95B, and a top flange section 102, which extends in opposite directions from the shank section 100 along the length of the upper edge of the rim section 94. As shown in the figures, the flange section 102 extends substantially beyond the shank section 100 so as to define an undercut between the lower edge of the flange section and the upper edge of the rim upper portion 95B. Although not essential, the hooks 98 are shown as being of the same thickness of the rim sections. In this regard, the hooks 98 can be stamped, punched or otherwise formed from the same material used to form the rim sections 94.

Figure 7:
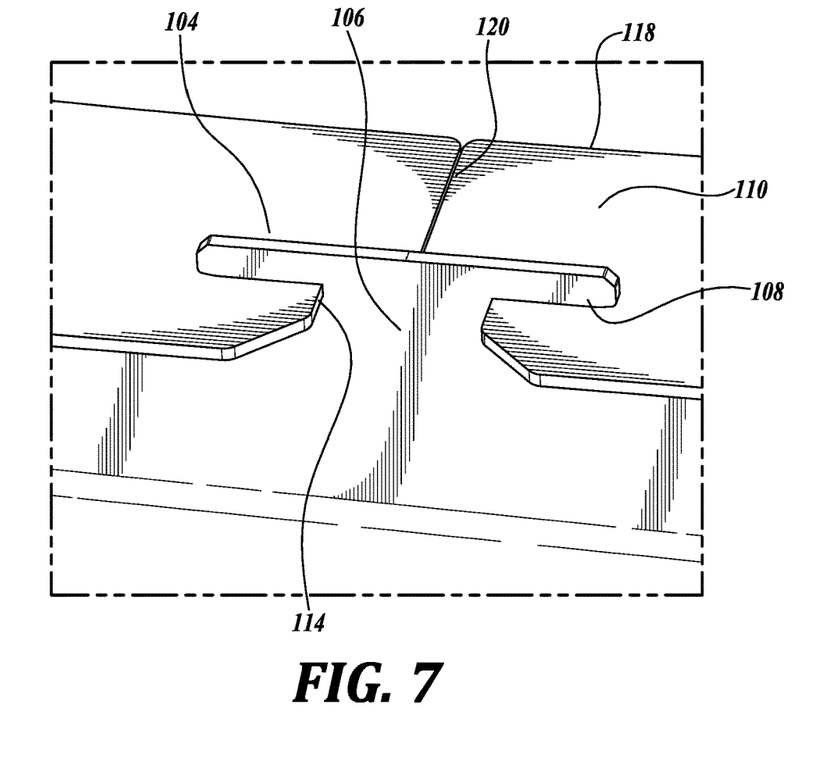
FIG. 7 is an enlarged pictorial view showing the ends of adjacent seal strips of the present disclosure mounted to the inner mezzanine.

The hooks 98 may all be of substantially the same size and shape with the exception of connection hooks 104, which as illustrated are located approximately centrally along the length of each rim section 94. As shown in FIG. 7, the connection hook 104 is formed with a wider shank section 106 than shank section 100 of the "standard" hooks 98. Further, the flange section 108 of the connection hooks 104 is longer in length than the "standard" flange sections 102 described above. As described below, the connection hook 104 is located at the intersection of adjacent seal strips 110. Although not essential, the hooks 104 can be of the same thickness as the rim sections 94. In this regard, the connection hooks can be stamped, punched or otherwise formed from the same material stock used to form rim section 94.

The seal strips or sections 110 are configured to engage the hooks 98 and 104 so as to be mounted on the rim sections 94 of the mezzanine 40 and project laterally outwardly from the mezzanine to abut against or to be disposed closely adjacent inside of the spiral conveyor stack 26. The seal strips 110 are illustrated as of a length corresponding to rim sections 94; however, the seal sections 110 are positioned to span between two adjacent rim sections 94. To this end, seal strips 110 include a series of slots 112, which may be of a length slightly shorter than the length of flange sections 102. The width of the slot 112 generally corresponds to the width of the hooks 98.

Figure 4:
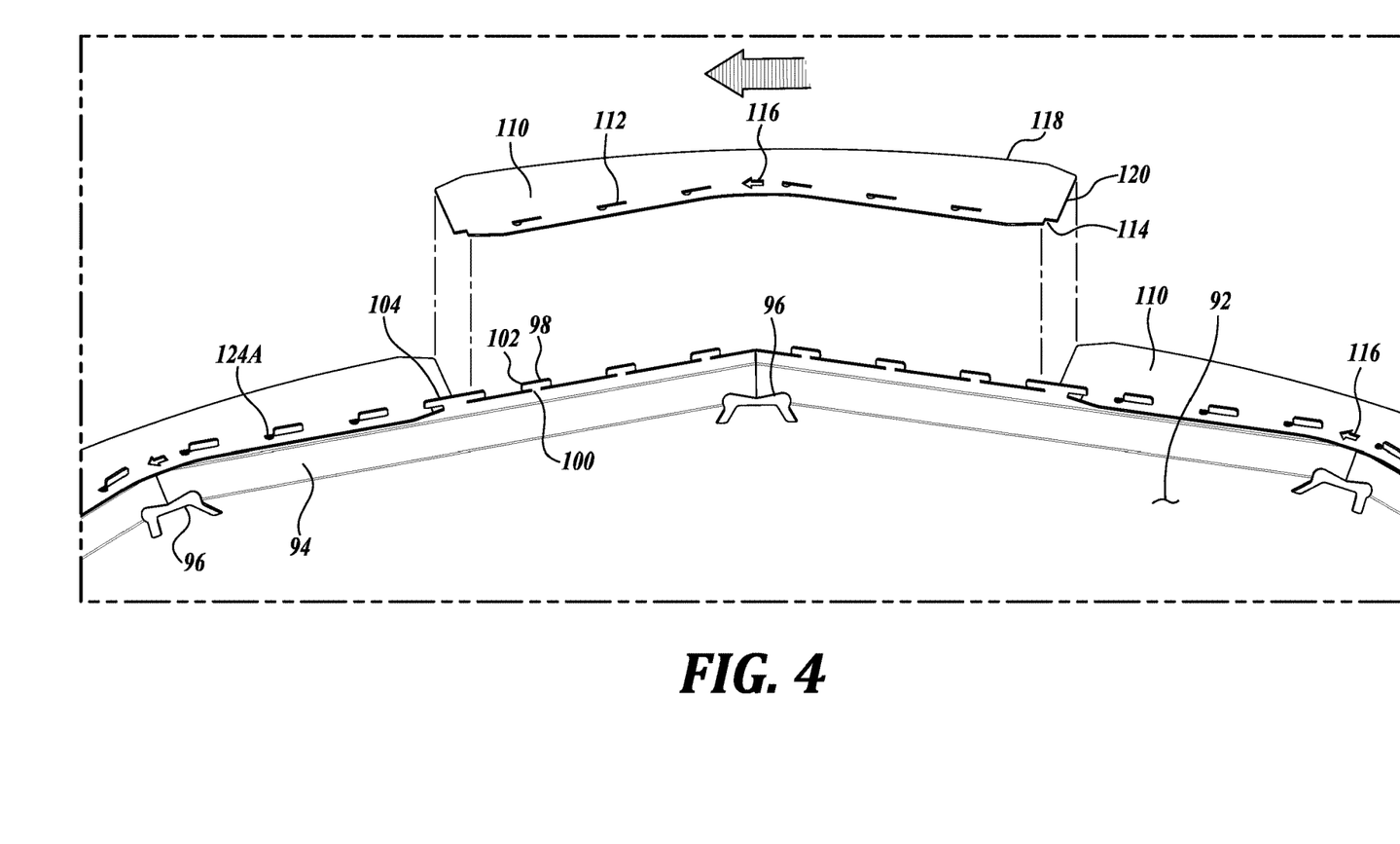
FIG. 4 is an enlarged fragmentary view of FIG. 3 with a seal strip exploded away to more clearly show the mounting structure of the seal strip.

Referring to FIGS. 4, 5, and 7, a notch 114 is formed at each end of seal section or strip 110. The notch 114 is sized and positioned to bear against the shank section 106 of a connector hook 104. The flange section 108 of the connector hook 104 overlaps the upper surface of the seal strip 110 adjacent the notch 114, see FIG. 7.

To install the seal strip 110, the seal strip is first positioned relative to two adjacent rim sections 94 to align slots 112 with hooks 98. The seal strip 110 is pushed downwardly relative to the hooks 98 so that the slots 112 extend downwardly over the hook flange sections 102. Once all of the slots 112 are engaged over the corresponding hooks, the seal strip is slid relative to the hook shanks in the direction of rotation of the spiral conveyor stack 26 until the hook shank abuts against the end of slot 112. In this regard, see the arrows 116 from on the seal strip 110 indicating the direction of rotation of the spiral conveyor stack 26.

When the strip section 110 is in place, the notches 114 at the end of the strip section bear against the shank sections 106 of the connector hooks 104. Also, the adjacent ends 120 of adjacent seal strips 110 bear against each other, as shown in FIG. 7. In this manner, a continuous seal is created along the circumference of the rim structure.

It will be appreciated that when the seal strips 110 are placed around the entire perimeter of the inner mezzanine 40, the exterior convex edges 118 of the seal strips 110 form a substantially circular outer sealing edge to lie closely against or bear against the inside of the spiral conveyor stack 26. Even though the perimeter of the floor structure 92 of the inner mezzanine 40 is in the form of a series of straight sections corresponding to rim sections 94, the placement of the slots 112 in the seal strips 110 correspond to the location of the hooks 98 along the rim sections 94, thereby to enable the outer edge 118 of the slot section 110 to form a segment of the circular outer perimeter of the sealing section 90, see FIG. 3.

Figure 6:
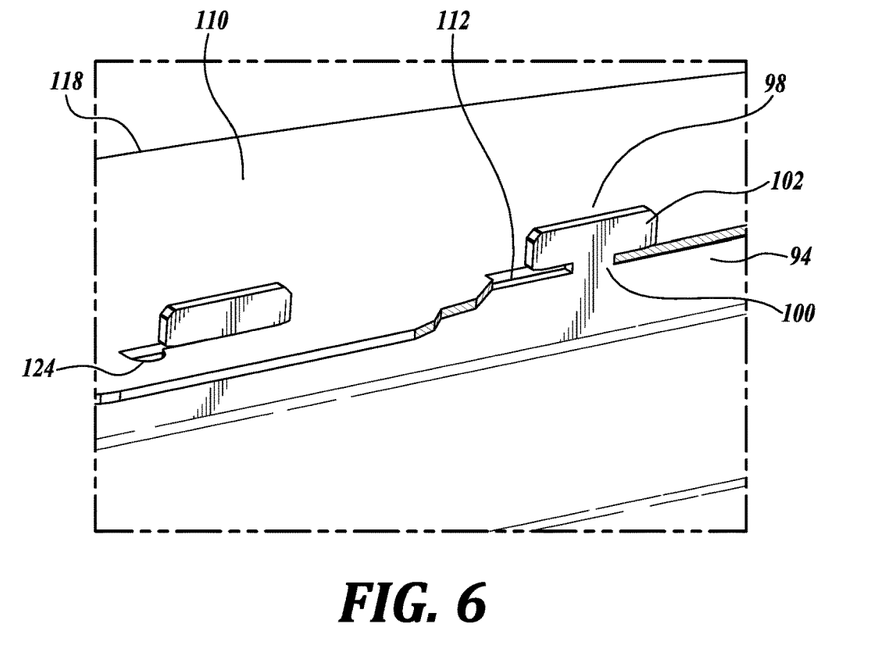
FIG. 6 is an enlarged pictorial view showing the mounting of seals of the present disclosure to a mezzanine located within the center of the spiral conveyor.

As shown in FIGS. 4, 5, and 6, drain holes 124 intersect with slots 112 to provide a passageway for moisture flow off the top surface of the seal strips 110 rather than collecting on the seal strips. The drain holes can be located along the length of the slots 112 including at the end of the slot apposite to the end of the slot that locks against the hook shank 100.

Outer Mezzanine Sealing System

Figure 8:
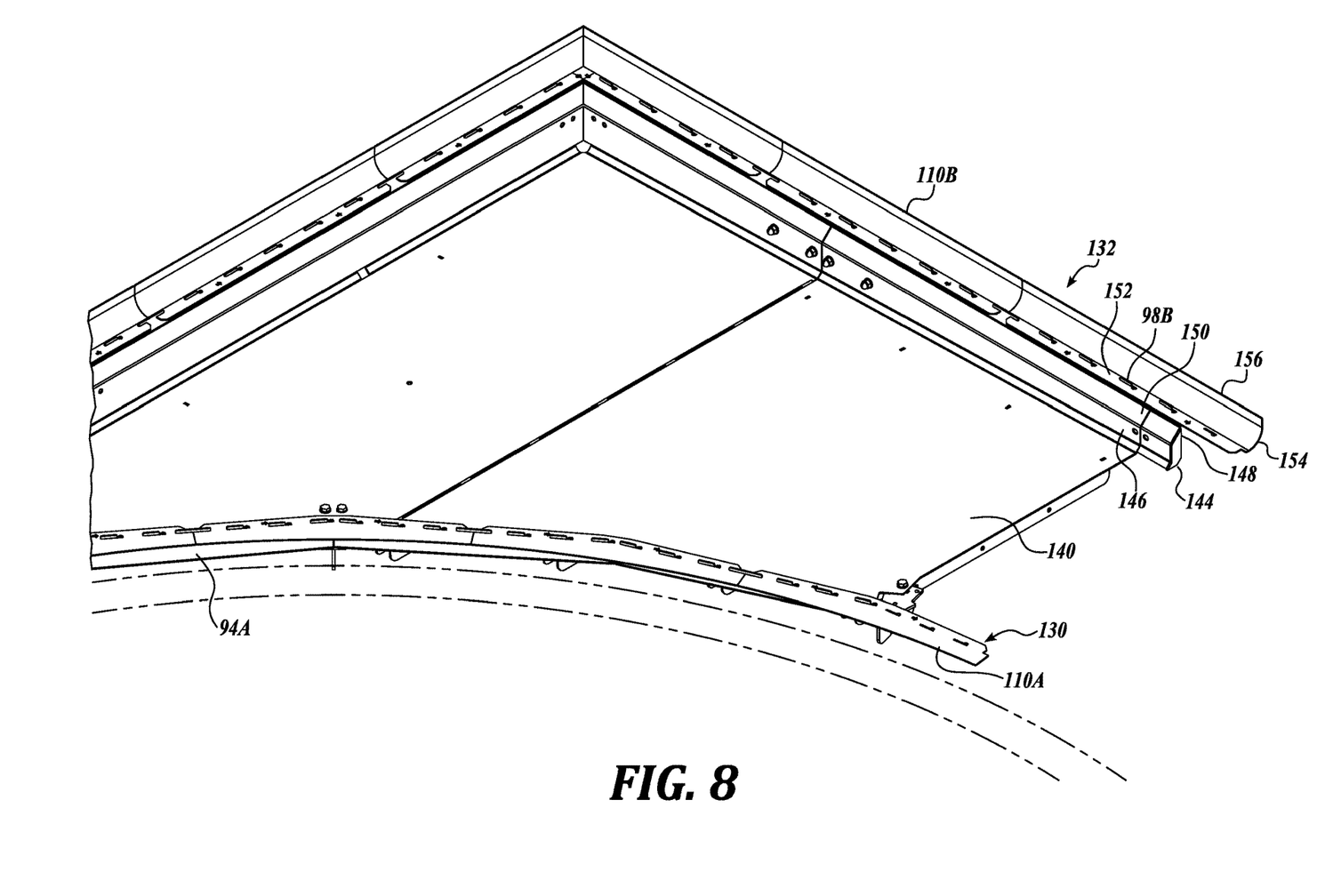
FIG. 8 is an enlarged pictorial view of a portion of FIG. 1 illustrating seal systems of the present disclosure between spiral conveyor and the exterior mezzanine and between the thermal processing chamber and the exterior mezzanine.
Figure 9:
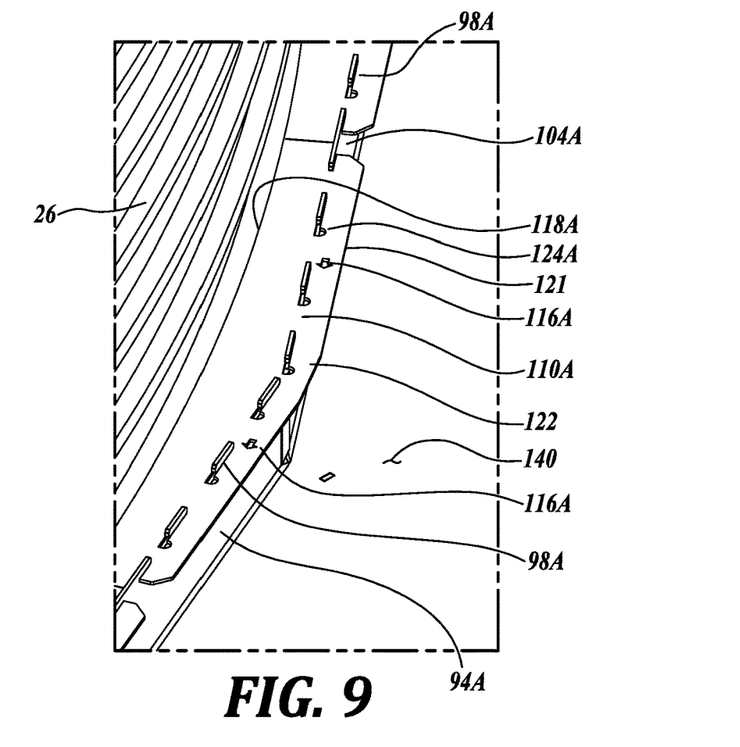
FIG. 9 is an enlarged fragmentary view of FIG. 1 illustrating the seal between the exterior mezzanine and the exterior of the spiral conveyor.
Figure 10:
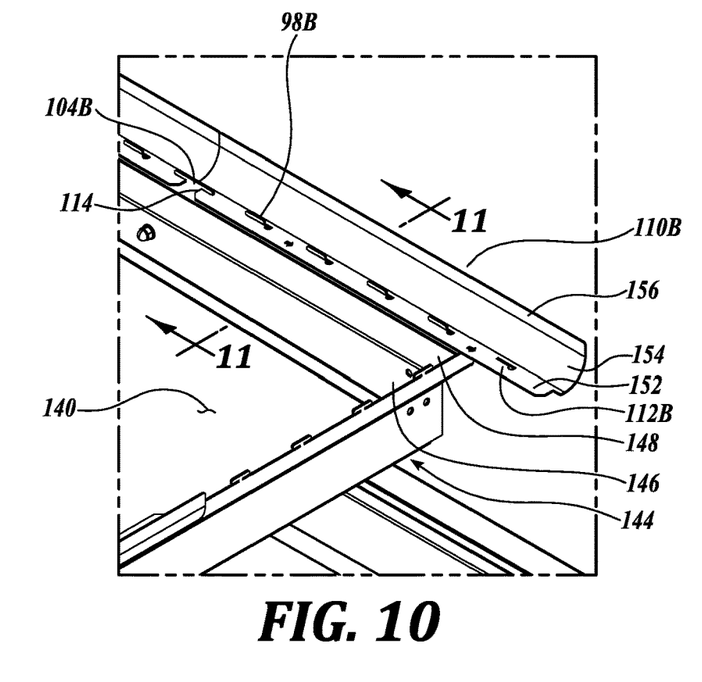
FIG. 10 is an enlarged fragmentary pictorial view of a portion of FIG. 1 illustrating the seal between the exterior mezzanine and the interior wall of the thermal processing chamber.
Figure 11:
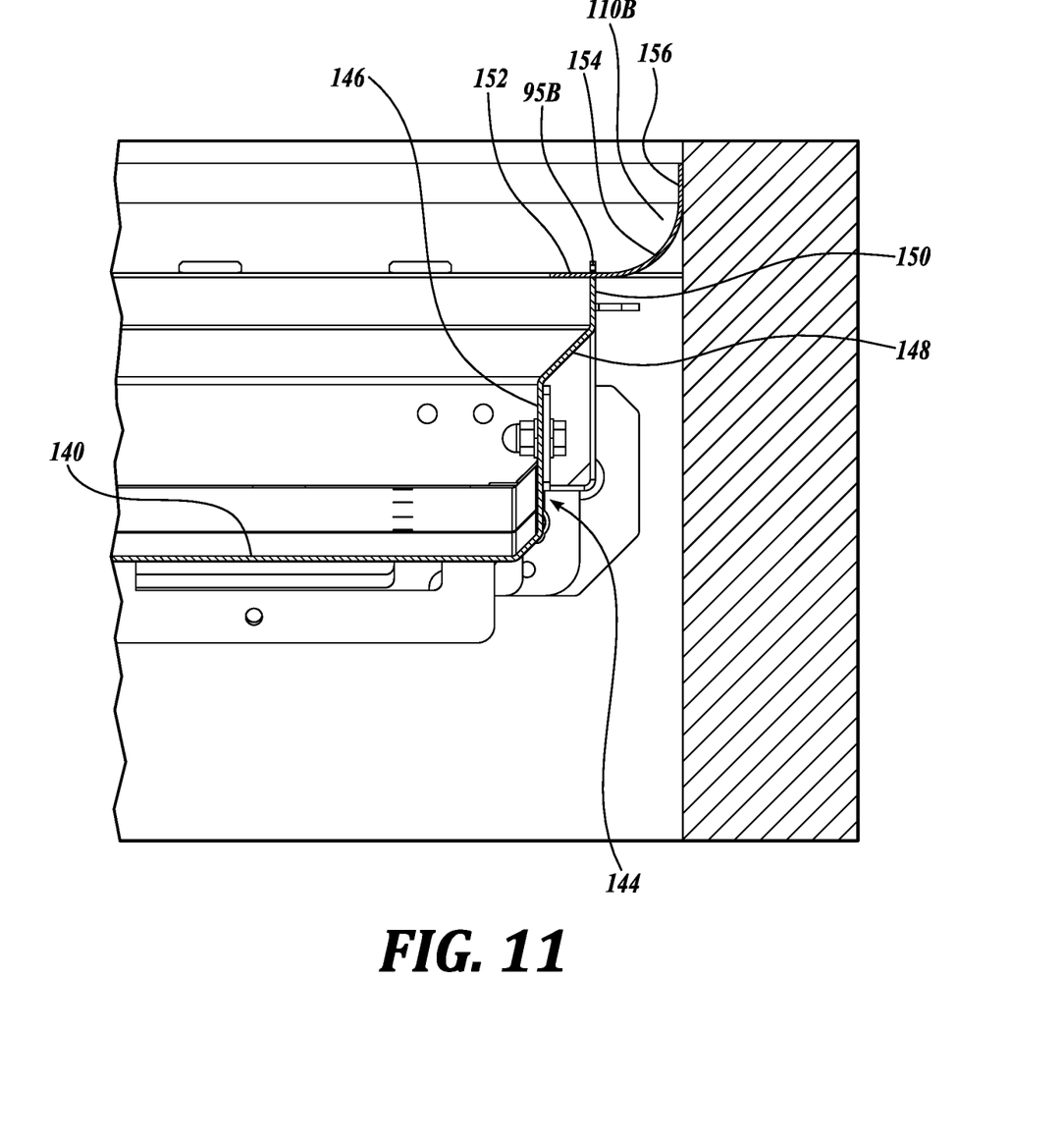
FIG. 11 is a cross-section view of FIG. 10, taken along lines 11-11 thereof.
Figure 12A:
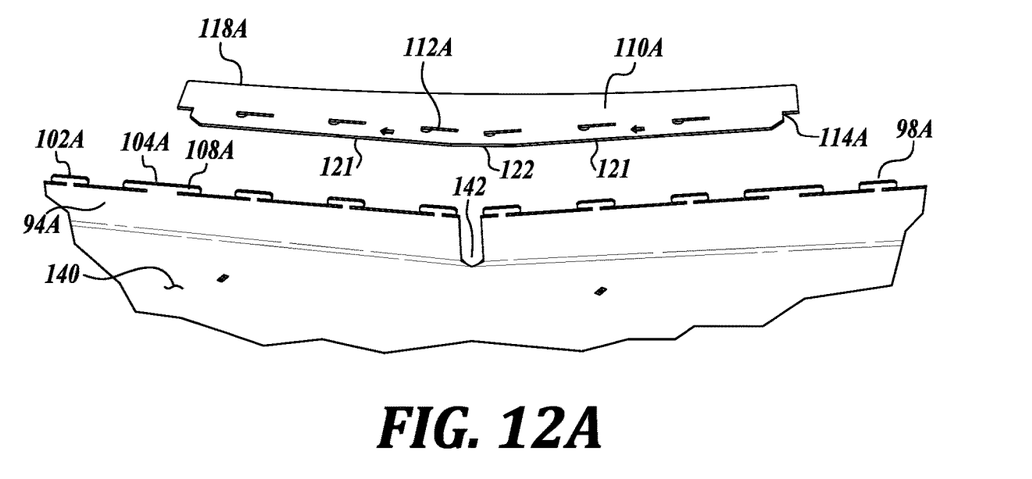
FIGS. 12A, 12B, and 12C illustrate the manner in which a seal of the present disclosure is mounted to the exterior mezzanine.
Figure 12B:
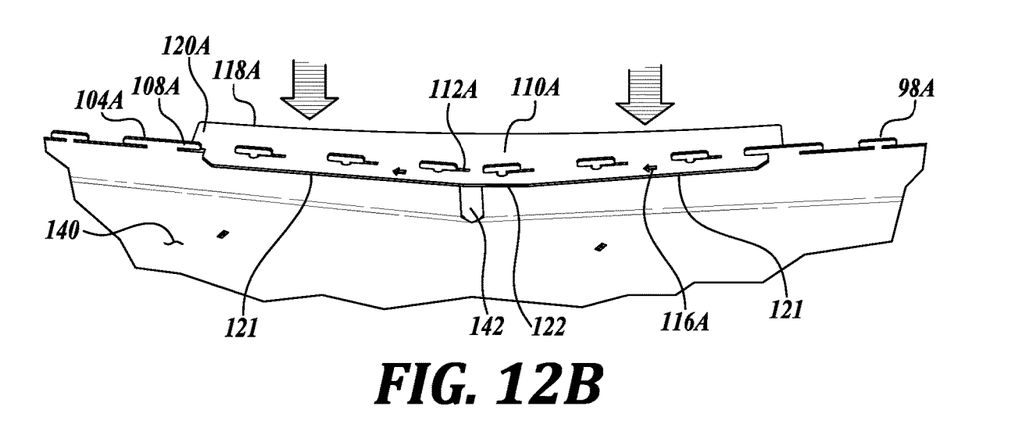
Figure 12C:
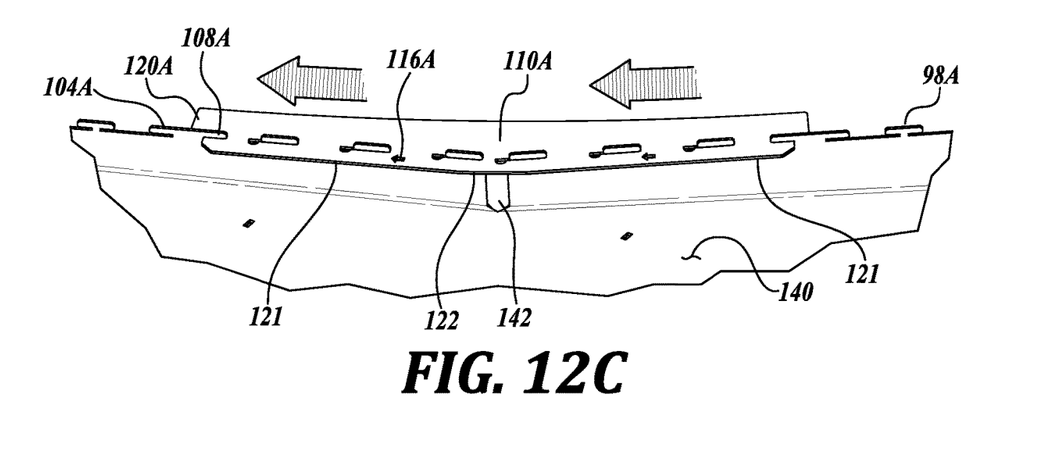

FIGS. 8-12 depict the manner in which the outer mezzanine 42 is sealed relative to the spiral conveyor stack 26 as well as relative to the end and side walls of the housing 50. FIG. 8 illustrates a portion of the outer mezzanine 42 which includes a corner section of the mezzanine. FIG. 8 shows a seal system 130 to seal the outer mezzanine 42 relative to the spiral conveyor stack 126 as well as a seal system 132 to seal the outer mezzanine 42 relative to the interior surfaces of the housing walls 56 and 58.

Initially discussing the seal system 130, such seal system extends along the opening formed in the mezzanine floor structure 140 through which the spiral conveyor stack 26 extends. As in the inner mezzanine 40, the outer mezzanine 42 includes a floor structure 140 that is constructed with sufficient integrity to support the weight of personnel, which as discussed previously, operate, repair, clean, etc., the thermal processing apparatus 20.

Referring specifically to FIGS. 8, 9, 12A, 12B, and 12C, the seal system 130 includes rim sections 94A that extend upwardly from the interior perimeter of the floor structure 140. As in the sealing system 90, the rim sections 94A are formed in straight sections that correspond to the straight sections that define the interior perimeter of the floor structure 140. Such straight sections extend between adjacent support posts 141 extending upwardly along the exterior of the spiral stack 26, see FIG. 1. The upwardly extending rim sections 94A of the floor form a kick guard that helps prevent accidentally wedging one's foot between the mezzanine floor 140 and the spiral stack, especially when the spiral stack is moving.

In a manner similar to sealing system 90, a series of hooks 98A extend along the upper edge of the rim section 94A. Such hooks are similar in construction and function to hooks 98 of the sealing system 90. Also in a manner similar to sealing system 90, the sealing system 130 also includes connection hooks 104A that are located centrally along the length of rim sections 94A. Such connection hooks 104A are constructed and function in a manner of the connection hooks 104 described above to interconnect the ends of seal strips 110A, see FIGS. 8, 9, and 11C.

The seal sections or strips 110A are similar to seal strips 110 except in the seal strips 110A, the sealing edge 118A thereof is concave in curvature rather than convex in curvature in the manner of the edge 118 sealing strips 110, so as to properly seal relative to the exterior of the spiral conveyor stack 26. Also in the manner of sealing strip 110, the opposite edge portion of sealing strip 110A, corresponding to the location of the slots 112A, define relatively straight edges 121 that intersect centrally at 122 along the length of the seal strip 110A. Also, notches 114A are formed at the intersection of the ends of the seal strips 110A and the outer edge portion 122 thereof.

As in the seal strip 110, the seal strip 110A includes spaced apart slots 112A corresponding to the location and size of the hooks 98A so that the seal strip 110A may be mounted to the upper edge portion of the rim sections 94A by insertion of the hooks 98A through the slots 112A, as shown in FIGS. 8, 9, 12A, and 12C. In such engaged position, the outer edge portions 118A of the seal sections 110A form a continuous substantially circular interior edge to be disposed closely adjacent to or against the exterior of the spiral conveyor stack 26, as shown in FIG. 1.

The seal sections 110A are installed in the same manner as seal section 110 described above by engaging the seal sections 110A downwardly so that the slots 112A are positioned below flange sections 102A of hooks 98A. Thereafter, the seal strips are slid in the direction corresponding to the rotational direction of the spiral conveyor stack, as shown by arrows 116A. As a result, the end of the slots 112A bear against the shank section 100A to thereby lock the seal strip 110A in place. In this position, as shown in FIG. 11C, the notch 114A at the ends of the seal strips 110A bear against the shank sections 106A of the connector hooks 104A, see FIG. 11C. In addition, the ends 120A of adjacent seal sections 110A abut together, see FIG. 9.

Also in the manner of sealing system 90, drain holes 124A intersect with the slots 112A so as to provide a passageway for moisture to flow off of the top surface of the seal strips 110A and not collect thereon.

FIGS. 1 and 8-11 depict the seal system 132 extending along the exterior of the outer mezzanine 140 to seal the outer mezzanine against the interior walls 56 and 58 of the housing 50. The outer seal system 132 includes an outer formed rim 144 extending around the outer perimeter of the mezzanine floor structure. The outer formed rim consisting of a first or lower substantially vertical section 146, an intermediate diagonal section 148 extending upwardly and outwardly from the lower vertical section 146, and then an upper vertical section 150 extending upwardly from the diagonal rim section 148.

As in the inward seal system 130, the outward seal system 132 includes hooks 98B spaced along the upper rim section 150. Also as in the seal system 130, the seal system 132 includes connection hooks 104B that function to interconnect the end sections of seal strip 110B. The hooks 98B and 104B are similar in construction to hooks 98 and 98A as well as construction hooks 104 and 104A.

The seal sections 110B when installed are of somewhat different cross-sectional shape than the seal strips 110 and 110A. In this regard, the seal sections 110B define an inward marginal section 152 along which the slots 112B are formed in a manner similar to slots 112 and 112A. From the inward margin 152, when installed, the seal section 110B in cross section is shaped into an arcuate or curved, downwardly concave intermediate section 154 terminating at an outward lip section 156 to press against the interior walls 56 and 58 of the housing 50. By this construction, the seal section 110B is able to accommodate variations in the gap or distance between the outer perimeter of the floor structure 140 and the location of the inside surfaces of the housing walls 56 and 58. Of course, the seal sections 110B can be of other cross-sectional shapes while performing the same function as seal section 110B.

The seal sections 110B can be of lengths similar to the lengths of the seal strips 110 and 110A; however, the seal sections 110B can be longer since such seal sections are straight rather than curved. Further, as in the seal strips 110 and 110A, the seal sections 110B can be constructed with end notches 114B similar to notches 114 so as to cooperatively engage with connection hooks 104B in the manner in which the seal strips 110 and 110A interconnect with connection hooks 104 and 104A, respectively.

The seal sections 110B are attached to the hooks 98B and 104B in a manner similar to the attachment of seal strips 110 and 110A to hooks 98, 98A, 104 and 104A.

The seal strips 110 and 110A as well as the seal sections 110B can be constructed of various materials that are both flexible and durable to provide a significant operating life. Examples of materials from which the seal strips/seal sections may be composed include a polyester elastomer resin or a thermoplastic polyether or polyurethane Although the hooks 98, 98A, and 98B are illustrated as generally being in the shape of a cleat hook of substantially the same thickness as the underlying rim sections 94, 94A, and 94B, the hooks instead could be of other constructions. For example, the hooks can be constructed with heads other than as flanges 102, 102A, or 102B. In this regard, the hooks can be constructed with heads of various shapes, such as square, circular, oval, elliptical with the size of the heads in plan view being larger (wider or longer) than the shank section of the hook so as to be able to retain the seal strips 110, 110A and seal sections 110B engaged with the hooks.

It will be appreciated that by the construction of the seal system 90 wherein the strip sections 110 are detachable from the connector hooks 104, the strip sections can be easily removable to clean both the seal strips and mezzanine floor much more thoroughly than if mounted in position as in the past. After cleaning, the strip section can be easily re-installed. The same advantage is provided by the construction of the seal system 132 with detachable seal strips 110A and 110B.

While illustrative embodiments have been illustrated and described, it will be appreciated that various changes can be made therein without departing from the spirit and scope of the invention.

The invention claimed is:

1. A seal system for sealing between a moving conveyor and a structure stationary relative to the conveyor, the structure having a margin adjacent the conveyor, the seal system comprising:
   a series of hooks extending along the margin of the structure, the hooks having a shank projecting from the structure margin and a flange extending from the shank and spaced from the structure margin; and
   at least one seal strip engageable with and disengageable from the hooks positioned along the structure margin, the seal strip comprising a plurality of slots extending through the seal strip and spaced apart to coincide with the spacing of the hooks, the slots having a length and a width to engage over the hook flanges and then slide relative to the hook shanks along the length of the structure margin to lock an end of the slots against the hook shanks.

2. The seal system according to claim 1, wherein the hook flange(s) are elongated in the direction along the structure margin.

3. The seal system according to claim 1, further comprising an upright rim extending along the structure margin to define an upper edge, the hooks extending upwardly from the rim upper edge.

4. The seal system according to claim 3, wherein the hooks are integrally formed with the rim.

5. The seal system according to claim 1, wherein the seal strip is flexible and of a width to closely abut or contact against the conveyor.

6. The seal system according to claim 1, wherein the seal strips have an attachment margin along which the slots are located and an opposed flexible seal margin for closely abutting or contacting the conveyor.

7. The seal system according to claim 1, wherein the structure margin is formed in a series of straight segments with adjacent segments disposed at an angle to each other to define an overall curved shape.

8. The seal system according to claim 1, wherein the margin of the structure forms an overall curved shape.

9. The seal system according to claim 1, wherein the conveyor is a spiral conveyor and the structure comprises a platform either surrounding or disposed within the interior of the spiral conveyor.

10. A seal system for forming a seal between first and second relatively movable structures, the seal system comprising:
    wherein one of the first and second structures having a margin adjacent the other of the first and second structures;
    a series of hooks extending along the margin of the first or second structure, the hooks having a shank portion projecting from the margin and a flange extending from the shank, the flange spaced from and extending along the margin of the structure; and
    at least one seal strip engageable and disengageable from the hooks, the seal strip comprising a plurality of slots extending through the seal strips and spaced apart to coincide with the spacing of the hooks, the slots having a length and a width to enable the slots to engage over the hooks and then slide relative to the hooks along the lengths of the slots to lock against the hook shanks; and
    the seal strip of a width to closely abut or contact against the other of the first and second structures when engaged with the hooks.

11. The seal system according to claim 10, wherein the hook comprising flanges extending in opposite directions from the shank along the structure margin.

12. The seal system according to claim 10, further comprising an upright rim extending along the structure margin to define an upper edge, the hooks extending upwardly from the rim upper edge.

13. The seal system according to claim 12, wherein the hooks are integrally formed with the rim.

14. The seal system according to claim 12, wherein the hooks extend along the length of the rim with the cleat hook flanges spaced from the rim.

15. The seal system according to claim 10, wherein the lengths of the slots are slightly shorter than the lengths of the cleat hook flanges.

16. The seal system according to claim 10, wherein the seal strip is flexible and of a width to be closely adjacent or contact against the first or second structure.

17. The seal system according to claim 10, wherein the seal strips have an attachment margin along which the slots are located and an opposed flexible seal margin for being closely adjacent or contacting the other of the first and second structures.

18. The seal system according to claim 10, wherein the structure perimeter is formed in straight segments with adjacent segments disposed at an angle to each other to define an overall curved structure.

19. The seal system according to claim 10, wherein the first structure is a spiral conveyor and the second structure comprises a platform either surrounding or disposed within the interior of the spiral conveyor.

20. The seal system according to claim 10, wherein the first structure is a wall and the second structure comprise a platform located adjacent the wall structure.

* * * * *